US008677454B2

(12) United States Patent
DeKoenigsberg et al.

(10) Patent No.: US 8,677,454 B2
(45) Date of Patent: Mar. 18, 2014

(54) UTILIZATION OF VIRTUAL MACHINES BY A COMMUNITY CLOUD

(75) Inventors: Greg DeKoenigsberg, Durham, NC (US); Mike McGrath, Schaumburg, IL (US)

(73) Assignee: Red Hat, Inc., Raleigh, NC (US)

( * ) Notice: Subject to any disclaimer, the term of this patent is extended or adjusted under 35 U.S.C. 154(b) by 403 days.

(21) Appl. No.: 12/782,462

(22) Filed: May 18, 2010

(65) Prior Publication Data

US 2011/0289555 A1 Nov. 24, 2011

(51) Int. Cl.
*G06F 9/455* (2006.01)
*G06F 15/16* (2006.01)
*G06F 21/00* (2013.01)

(52) U.S. Cl.
USPC ............... 726/3; 709/202; 709/203; 709/217; 709/218; 709/223; 709/224

(58) Field of Classification Search
USPC ........... 726/3; 718/1; 709/202, 203, 217, 218, 709/223, 224
See application file for complete search history.

(56) References Cited

U.S. PATENT DOCUMENTS

2010/0131324 A1\* 5/2010 Ferris ................................ 705/8
2010/0169477 A1\* 7/2010 Stienhans et al. ............. 709/224
2011/0258621 A1\* 10/2011 Kern ................................. 718/1

\* cited by examiner

*Primary Examiner* — Brandon Hoffman
*Assistant Examiner* — Samuel Ambaye
(74) *Attorney, Agent, or Firm* — Lowenstein Sandler LLP

(57) ABSTRACT

A mechanism for utilization of virtual machines by a community cloud is disclosed. A method of the invention includes authenticating a virtual machine (VM) to be joined to a cloud environment managed by a central administrative computing device as a cloud computing resource, wherein the VM is operating on a workstation that is not a dedicated cloud computing resource, updating a database of VMs utilized as cloud computing resources with information of the VM related to its operational status, and providing instructions for the VM to operate as a cloud computing resource, the instructions based on current demand for cloud services of the cloud environment and an overall current supply of cloud computing resources presently available in the cloud environment.

15 Claims, 5 Drawing Sheets

HAProxy version 1.3.23, released 2010/01/28

Statistics Report for pid 21814

> General process information pid = 21814 (process #1, nbproc = 1)
uptime = 2d 2h54m45s
system limits: memmax = unlimited; ulimit-n = 8969
maxsock = 8969; maxconn = 4096; maxpipes = 0
current conns = 1; current pipes = 0/0
Running tasks: 1/756

| | active UP | | backup UP | Display option: | External ressources: |
|---|---|---|---|---|---|
| | active UP, going down | | backup UP, going down | • Hide 'DOWN' servers | • Primary site |
| | active DOWN, going up | | backup DOWN, going up | • Refresh now | • Updates (v1.3) |
| | active or backup DOWN | | not checked | • CSV export | • Online manual |

Note: UP with load-balancing disabled is reported as "NOLB".

stats

| | Queue | | Session rate | | | Sessions | | | | Bytes | | Denied | | Errors | | | Warnings | | Server | | | | | |
|---|---|---|---|---|---|---|---|---|---|---|---|---|---|---|---|---|---|---|---|---|---|---|---|---|
| | Cur | Max | Cur | Max | Limit | Cur | Max | Limit | Total | LbTot | In | Out | Req | Resp | Req | Conn | Resp | Retr | Redis | Status | Wght | Act | Bck | Chk | Dwn | Dwntme | Thrtle |
| Frontend | | | 1 | 1 | | 1 | 2 | 2 000 | 2 | | 493 | 496 438 | 0 | 0 | | | | 0 | 0 | OPEN | | | | | | |
| Backend | 0 | 0 | 0 | 0 | | 0 | 0 | 2 000 | 0 | 0 | 493 | 496 438 | | 0 | 0 | 0 | 0 | 0 | 0 | 25d2h UP | 0 | 0 | 0 | 0 | 0 | |

230 240 250 260 270 280 220 cloudtest

| | Queue | | Session rate | | | Sessions | | | | Bytes | | Denied | | Errors | | | Warnings | | Server | | | | | | |
|---|---|---|---|---|---|---|---|---|---|---|---|---|---|---|---|---|---|---|---|---|---|---|---|---|---|
| | Cur | Max | Limit | Cur | Max | Limit | Cur | Max | Limit | Total | LbTot | In | Out | Req | Resp | Req | Conn | Resp | Retr | Redis | Status | Wght | Act | Bck | Chk | Dwn | Dwntme | Thrtle |
| Frontend | | | 0 | 0 | | 0 | 0 | 2 000 | 0 | | 0 | 0 | 0 | 0 | | | | 0 | 0 | OPEN | | | | | | |
| node2 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| node0-2 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| node0-3 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| node0-4 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| node0-5 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| node0-6 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| node0-7 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| node0-8 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |

. . .

| node2-253 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| node2-254 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| node2-255 | 0 | 0 | 0 | 0 | | 0 | 0 | - | 0 | 0 | 0 | 0 | | 0 | 0 | 0 | 0 | 0 | 0 | 25d2h DOWN | 1 | Y | - | 0 | 1 | 25d2h | - |
| Backend | 0 | 0 | 0 | 0 | | 0 | 0 | 2 000 | 0 | 0 | 0 | 0 | | 0 | 0 | 0 | 0 | 0 | 0 | 25d2h DOWN | 0 | 0 | 0 | 0 | 1 | 25d2h | |

FIG. 2

UTILIZATION OF VIRTUAL MACHINES BY A COMMUNITY CLOUD

TECHNICAL FIELD

The embodiments of the invention relate generally to virtualization systems and, more specifically, relate to utilization of virtual machines by a community cloud.

BACKGROUND

Cloud computing is the provision of dynamically scalable and often virtualized resources as a service over the Internet on a utility basis. Users do not have to have any knowledge of, expertise in, or control over the technology infrastructure in the "cloud" that supports them. Cloud computing services often provide common business applications online that are accessed from a web browser, while the software and data are stored on the servers.

Cloud computing customers do not generally own the physical infrastructure serving as host to the software platform in question. They typically consume resources as a service and pay only for resources that they use. The majority of cloud computing infrastructures consist of reliable services delivered through data centers and built on servers with different levels of virtualization technologies. The services are accessible anywhere that provides access to networking infrastructure. Clouds often appear as single points of access for all consumers' computing needs.

The rise of the virtualization environment has provided for the advent of virtual machines (VMs). In computer science, a VM is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs. Virtualization systems provide a potential means to access computing resources in a confidential and anonymous way.

Solutions exist that employ virtual machines as computing resources in cloud computing. However, in a traditional cloud environment all of the VMs are hosted by dedicated servers sitting in rows of server racks. However, such an architecture may be expensive and difficult to maintain, as well as presenting limits on computing capacity. There is a wealth of untapped resources that can be found in individual users' computers, such as at home or in the organizational setting. Such computing machines can provide hosting for VMs, but are not part of the "dedicated" cloud computing resource environment.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 2 is a block diagram of an exemplary interface for tracking and managing VMs on non-dedicated workstations that are used to adapt the workstation as a cloud computing resource according to an embodiment of the invention;

DETAILED DESCRIPTION

Figure 1:
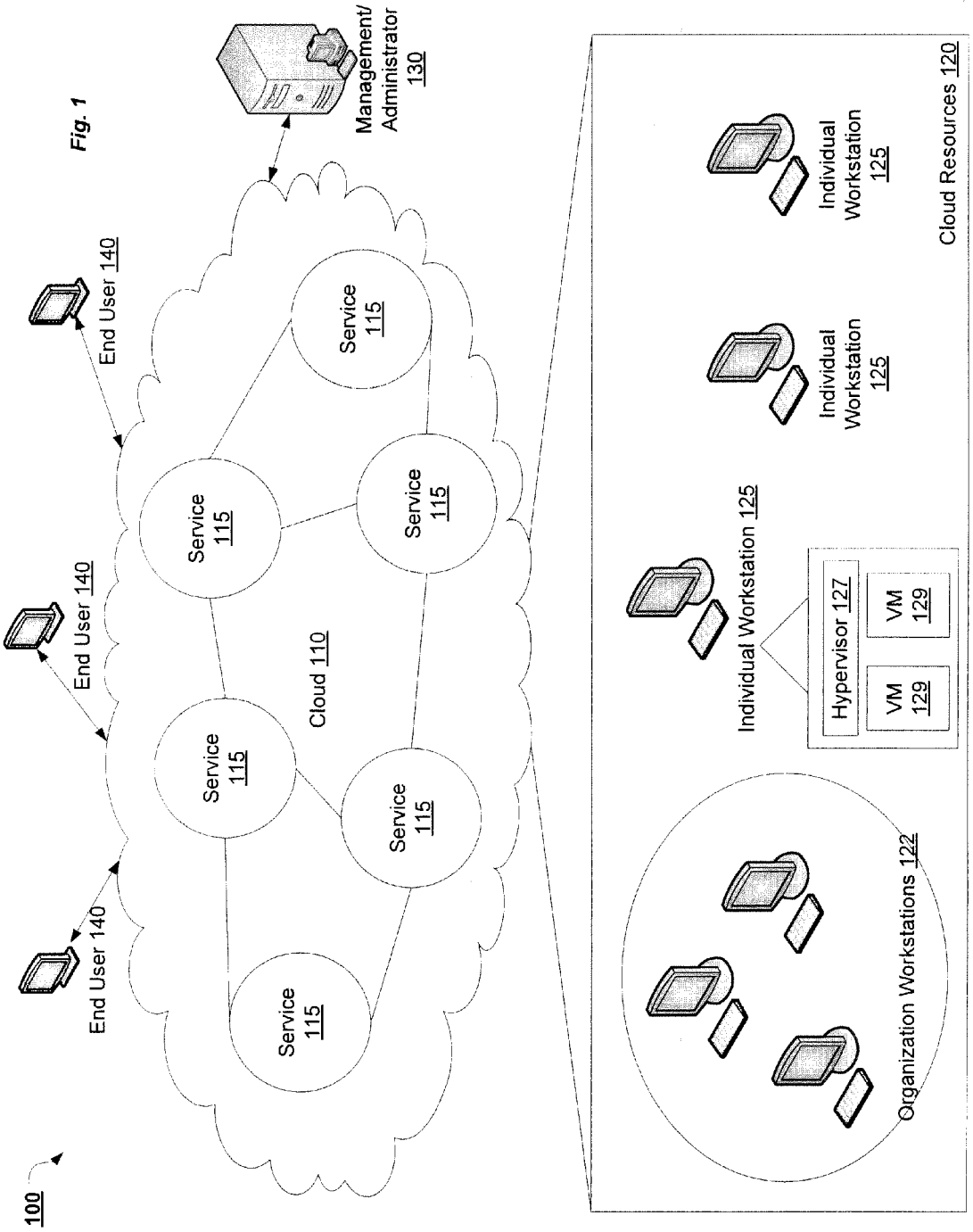
FIG. 1 is a block diagram of an exemplary cloud computing architecture in which embodiments of the present invention may operate.

Embodiments of the invention provide a mechanism for utilization of virtual machines by a community cloud. A method of embodiments of the invention includes authenticating a virtual machine (VM) to be joined to a cloud environment managed by a central administrative computing device as a cloud computing resource, wherein the VM is operating on a workstation that is not a dedicated cloud computing resource, updating a database of VMs utilized as cloud computing resources with information of the VM related to its operational status, and providing instructions for the VM to operate as a cloud computing resource, the instructions based on current demand for cloud services of the cloud environment and an overall current supply of cloud computing resources presently available in the cloud environment.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "authenticating", "updating", "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for utilization of virtual machines by a community cloud. Embodiments of the invention provide a means for users to utilize their own resources to apply to a cloud computing environment that can then be used as a resource to provide services from the cloud computing environment. A VM is downloaded to any workstation that, when operating, proposes the workstation as a dedicated cloud computing resource. At all other times that the VM is not running, the workstation is used for other tasks that are not dedicated as cloud computing resources.

FIG. 1 illustrates an exemplary cloud computing architecture 100 in which embodiments of the present invention may operate. The cloud computing architecture 100 may include a cloud 110 comprising dynamically scalable and virtualized resources used to provide services 115 over the Internet. One or more end users 140 may access and utilize the services 115 without having to maintain dedicated hardware on their end.

As illustrated, a break-out box of the cloud 110 shows the actual cloud resources 120 including hardware that may be utilized by embodiments of the invention as computing resources of the cloud 110. Embodiments of the invention may access one or more resources that are not dedicated to cloud computing, and adapt them to be utilized as a cloud resource. For example, embodiments of the invention may adapt an individual end user's workstation 125 as a cloud computing resource and/or may adapt one or more workstations of an organization, that are purposed for tasks other than cloud computing, as a cloud computing resource.

In embodiments of the invention, individual and organizational workstations 122, 125 are capable of running one or more virtual machines (VMs) 129. Each VM 129 runs a guest operating system (OS) that may be different from one another. The guest OS may include Microsoft Windows, Linux, Solaris, Mac OS, etc. The workstation 122, 125 may include a hypervisor 127 that emulates the underlying hardware platform for the VMs 129. The hypervisor 127 may also be known as a virtual machine monitor (VMM), a kernel-based hypervisor or a host operating system. In one embodiment, each VM 129 may be accessed by one or more of clients over a network (not shown). The network may be a private network (e.g., a local area network (LAN), wide area network (WAN), intranet, etc.) or a public network (e.g., the Internet).

Embodiments of the invention utilize non-dedicated cloud computing resources, such as individual workstations 125 or organizational workstations 122, as cloud computing resources. For example, embodiments of the invention may utilize a computing device at home 125 that is completely unused from the hours of 10:00 pm to 8:00 am. Assume that the end user of that individual workstation 125 would like to dedicate their computer to some organization during that time for that organization's use. The end user would not want the organization accessing all their private information, passwords, etc on the workstation 125. Therefore, embodiments of the invention provide a way for the individual workstation to be used as a computing resource for the cloud 110 without directly logging into the computer.

Specifically, a dedicated VM 129 is setup and utilized on the workstation 122, 125 to purpose the individual workstation as a cloud computing resource during the desired time. In one embodiment, the VM image 129 is downloaded from a specific location, such as from a management or administrative location 130 of the cloud 110. The VM image then boots up on the workstation 122, 125, uses Dynamic Host Configuration Protocol (DHCP) from the workstation's network, and, in some cases, even receives a private Internet Protocol (IP) address for communications (as the Internet Service Provider (ISP) of the individual workstation probably did not provide several external IPs for their use). The end user would not have access into this VM and vice versa.

Once the VM 129 is up and running, it connects into the organization providing the cloud computing resources via a virtual private network (VPN) to a central management machine (or set of machines) 130. At this point, a central administrator 130 can then track what VMs are available at any given time, log in and use that VM for whatever the demands are dictating.

FIG. 2 is a block diagram of an exemplary interface 200 for tracking and managing VMs on non-dedicated workstations that are used to adapt the workstation as a cloud computing resource according to an embodiment of the invention. Interface 200 provides a listing of workstations 210 that have downloaded the VM that adapts the workstation as a cloud computing resource. The interface 200 also provides information on whether the particular VM is up and running (status) 220, session rate 230, session statistics 240, bytes in and out 250, denials 260, errors 270, warnings 280, and so on. One skilled in the art will appreciate that interface 200 is one of many different management interfaces that may be utilized in embodiments of the invention and that embodiments of the invention are not limited to such an interface 200.

Figure 3:
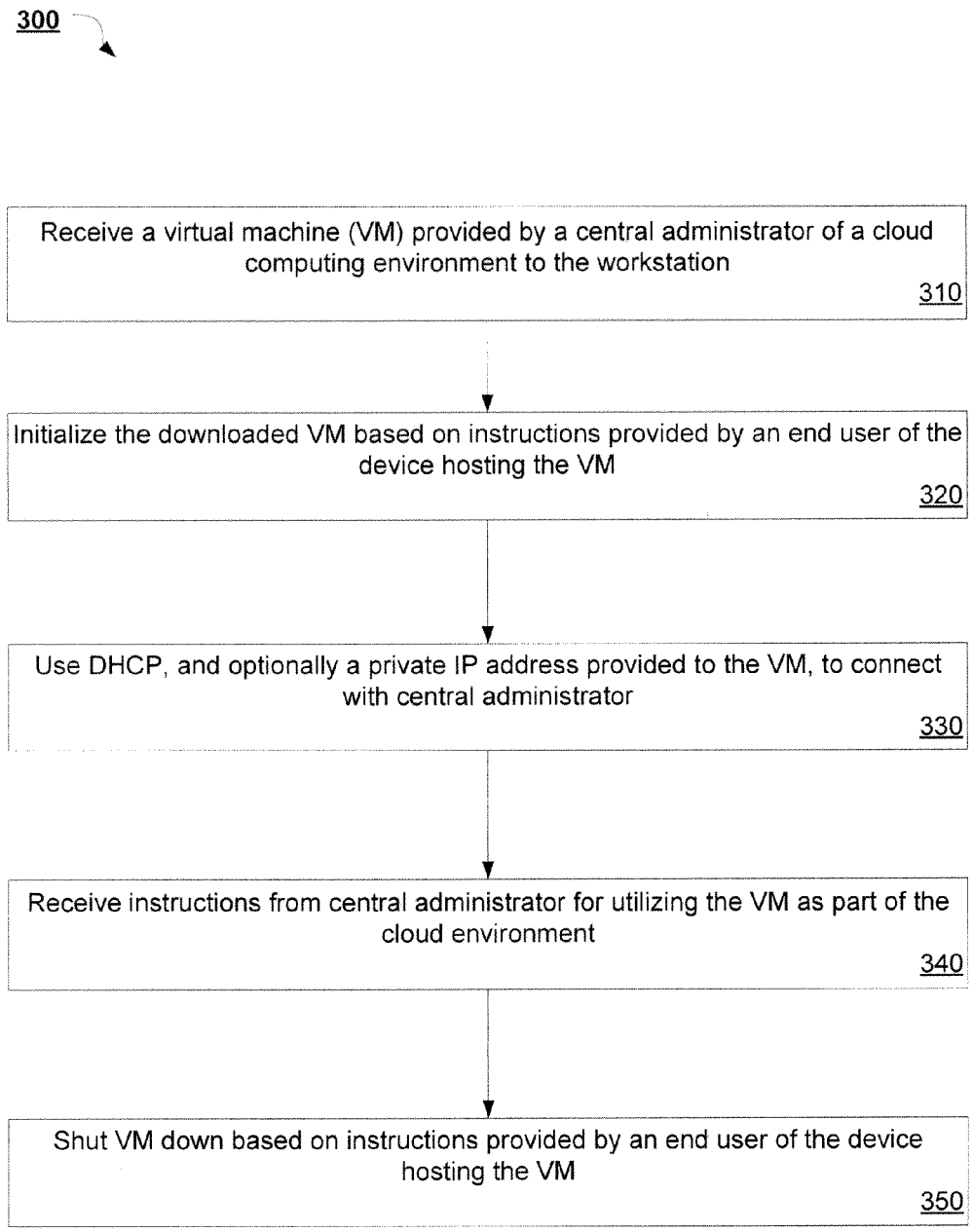
FIG. 3 is a flow diagram illustrating a method performed by a workstation for utilization of virtual machines by a community cloud according to an embodiment of the invention.

FIG. 3 is a flow diagram illustrating a method 300 performed by a workstation for utilization of virtual machines by a community cloud according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by workstation 122, 125 of FIG. 1.

Method 300 begins at block 310 where a VM provided by a central administrator of a cloud computing environment is downloaded to a workstation. In one embodiment, the workstation is one that is not dedicated as a cloud computing resource, and has elected to download the VM. In one embodiment, the end user of the workstation themselves makes the election to download the VM, such as in the case of an individual workstation. In another embodiment, an organization IT administrator elects for one of the organization's workstations to download the VM, such as in the case of multiple organizational workstations. At block 320, the downloaded VM is initialized on the workstation according to instructions provided by an end user of the device hosting the VM. In some embodiments, this initialization may occur arbitrarily based on the preferences of the end user. In other embodiments, the initialization may occur according to a schedule set by the end user. In the case of an arbitrary start up of a VM, the management or administrator of the cloud computing environment may detect the online presence of the VM and proceed accordingly.

Then, at block 330, the VM is connected to the central administrator using DHCP. In some cases, the VM may also utilize a private IP address provided to the VM by the central administrator, which is useful in the case where the ISP of the individual workstation did not provide several external IPs for the workstation's use.

At block 340, instructions are received at the VM from the central administrator for utilizing the VM as part of the cloud environment. For instance, the central administrator may direct the VM to run a particular program or store particular data to aid in the provision of a service via the cloud environment. Lastly, at block 350, the VM is shut down based on instructions provided by an end user of the device hosting the VM. In some embodiments, the end user of the workstation may dictate the predetermined time interval or it may be arbitrary. In other embodiments, if the workstation is part of an organization, the organization may set the predetermined time interval.

Figure 4:
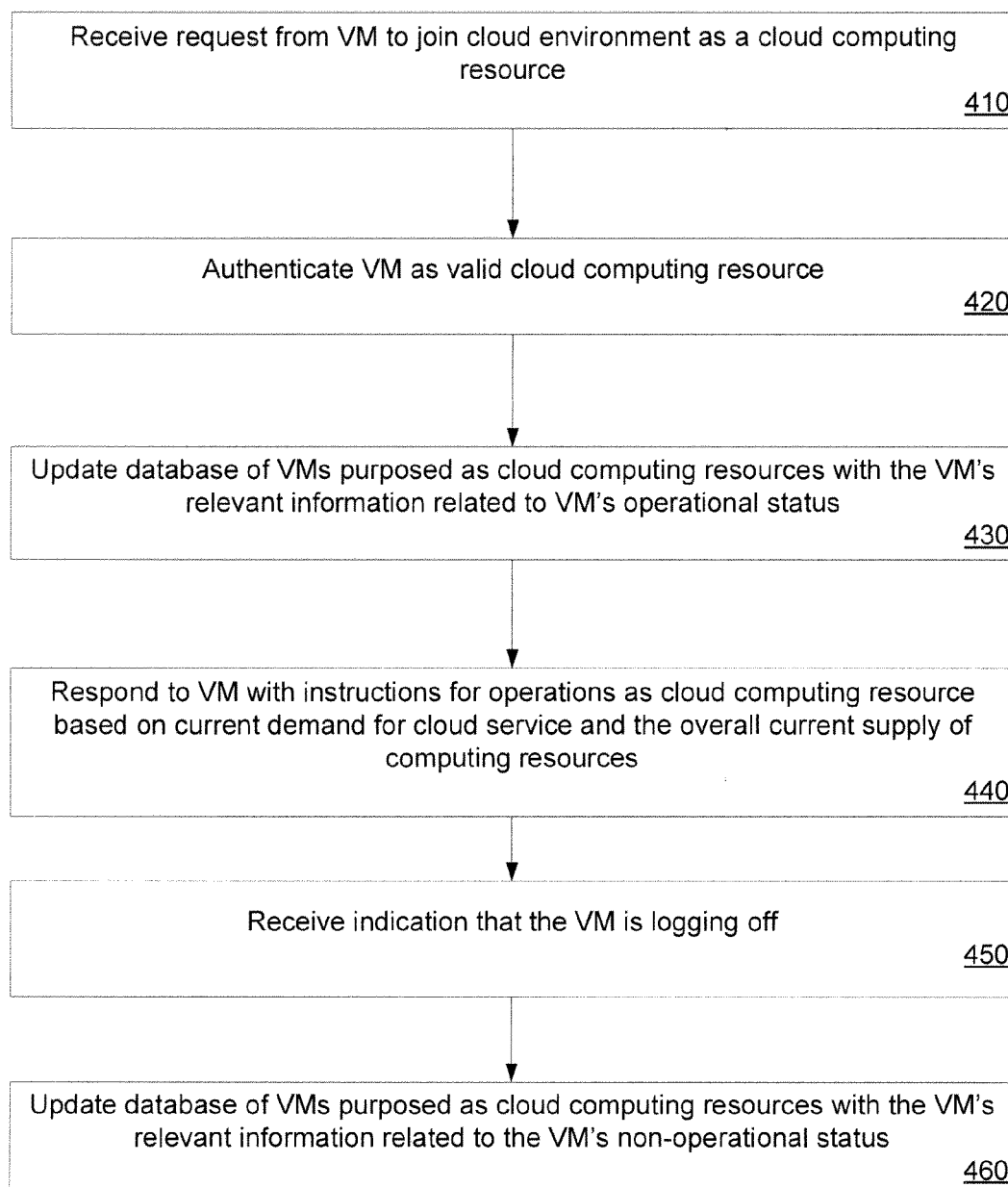
FIG. 4 is a flow diagram illustrating a method performed by a central administrator for utilization of virtual machines by a community cloud according to an embodiment of the invention.

FIG. 4 is a flow diagram illustrating a method 400 performed by a central administrator for utilization of virtual machines by a community cloud according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by management/administrator 130 of FIG. 1.

Method 400 begins at block 410 where a VM to be joined to a cloud environment as a cloud computing resource is identified (e.g., based on a request received from the VM or based on a scheduling or some other event detected at the administrator 130). In one embodiment, the VM is downloaded at a workstation that is not a typical dedicated cloud computing resource. At block 420, the VM is authenticated as a valid cloud computing resource. This may involve comparing identifying information of the VM with a database of registered cloud computing resources. In this case, the management/administrator 130 may have registered the VM as a cloud computing resource when it initially provided the VM for downloading at the workstation.

At block 430, the database of registered cloud computing resources is updated with relevant information pertaining to the operational status of the VM. For example, the database may track information on whether the particular VM is up and running, session rate, sessions statistics, bytes in and out, denials, errors, warnings, and so on. This information is updated when the VM signs into the central administrator. At block 440, instructions for the desired operations that the VM should undertake as a cloud computing resource are sent to the VM. The instructions are determined based on current demand for cloud services and the overall current supply of computing resources. For instance, the VM may be directed to run a particular program or store particular data to aid in the provision of a service via the cloud environment.

Subsequently, at block 450, an indication is received from the VM that it is logging off as a cloud computing resource. Lastly, at block 460, the database of registered cloud computing resources is updated with relevant information pertaining to the non-operational status of the VM. Specifically, the fields associated with the VM in the database will be updated to show that the VM is now down and to clear the statistics associated with the previous session of the VM.

Figure 5:
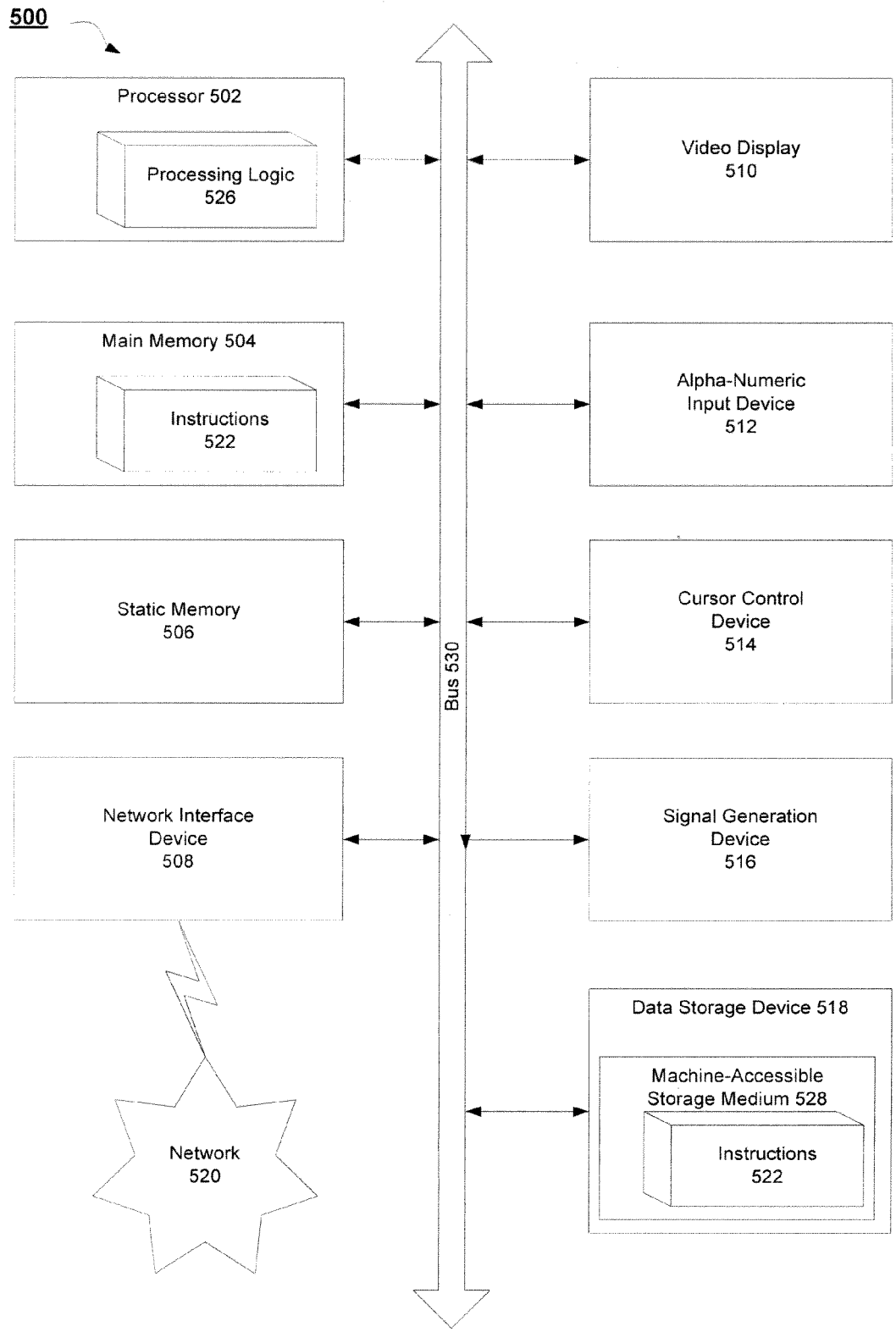
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform utilization of virtual machines by a community cloud by cloud computing environment 100 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 200 and 300 for utilization of virtual machines by a community cloud described with respect to FIGS. 2 and 3, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
providing, by an administrative computing device, a virtual machine (VM) to a workstation that is not a dedicated cloud computing resource of a cloud environment managed by the administrative computing device;
authenticating, by the administrative computing device, the VM for inclusion in the cloud environment as a cloud computing resource of the cloud environment;
updating, by the administrative computing device, a database of VMs utilized as cloud computing resources with information of the VM related to its operational status;
providing, by the administrative computing device to the VM, instructions for the VM to operate as the cloud computing resource in the cloud environment, the providing the instructions in view of current demand for cloud services of the cloud environment and an overall current supply of cloud computing resources presently available in the cloud environment;
establishing, by the administrative computing device once the VM is initiated on the workstation, a connection to the VM via dynamic host configuration protocol (DHCP);
receiving, by the administrative computing device, authentication from the VM via the connection;
providing, by the administrative computing device, a private Internet Protocol (IP) address to the VM if the workstation does not have multiple external IP addresses to work with;
receiving, by the administrative computing device, an indication that the VM is logging off from the administrative computing device; and
updating, by the administrative computing device, the database of VMs utilized as cloud computing resources with information of the VM related to its non-operational status.

2. The method of claim 1, further comprising receiving a workstation request for a copy of an image of the VM for download on the workstation in order to adapt the workstation as a cloud computing resource.

3. The method of claim 1, wherein the information of the VM related to its operational status comprises at least one of information on whether the particular VM is running, a current session rate, current session statistics, bytes in and out, denials, errors, or warnings.

4. The method of claim 1, wherein an end user of the workstation is not able to access the operational state of the VM.

5. The method of claim 1, wherein the workstation is an employee workstation of an organization that the organization has purposed as a cloud computing resource during a predetermined time interval.

6. A system, comprising:
a processing device;
a memory communicably coupled to the processing device;
a database communicably coupled to the memory and the processing device, the database to maintain information for virtual machines (VMs) utilized as cloud computing resources; and
a cloud environment administrative component executable from the memory by the processing device, the cloud environment administrative component to:
provide a virtual machine (VM) to a workstation that is not a dedicated cloud computing resource of a cloud environment managed by the cloud environment administrative component;
authenticate the VM for inclusion in the cloud environment as a cloud computing resource of the cloud environment;
update a database of VMs utilized as cloud computing resources with information of the VM related to its operational status; and
provide, to the VM, instructions for the VM to operate as the cloud computing resource in the cloud environment, the providing the instructions in view of current demand for cloud services of the cloud environment and an overall current supply of cloud computing resources presently available in the cloud environment;
establish, once the VM is initiated on the workstation, a connection to the VM via dynamic host configuration protocol (DHCP);
receive authentication from the VM via the connection;

provide a private Internet Protocol (IP) address to the VM if the workstation does not have multiple external IP addresses to work with;

receive an indication that the VM is logging off from the administrative computing device; and update the database of VMs utilized as cloud computing resources with information of the VM related to its non-operational status.

7. The system of claim 6, wherein the cloud environment administrative component further to receive a workstation request for a copy of an image of the VM for download on the workstation in order to adapt the workstation as a cloud computing resource.

8. The system of claim 6, wherein the information of the VM related to its operational status comprises at least one of information on whether the particular VM is running, a current session rate, current session statistics, bytes in and out, denials, errors, or warnings.

9. The system of claim 6, wherein an end user of the workstation is not able to access the operational state of the VM.

10. The system of claim 6, wherein the workstation is an employee workstation of an organization that the organization has purposed as a cloud computing resource during a predetermined time interval.

11. A non-transitory machine-readable storage medium including instructions that, when accessed by a processing device, cause the processing device to perform operations comprising:

providing, by the processing device, a virtual machine (VM) to a workstation that is not a dedicated cloud computing resource of a cloud environment managed by an administrative computing device comprising the processing device;

authenticating, by the processing device, the VM for inclusion in the cloud environment as a cloud computing resource of the cloud environment;

updating, by the processing device, a database of VMs utilized as cloud computing resources with information of the VM related to its operational status;

providing, by the processing device to the VM, instructions for the VM to operate as the cloud computing resource in the cloud environment, the providing the instructions in view of current demand for cloud services of the cloud environment and an overall current supply of cloud computing resources presently available in the cloud environment;

establishing, by the processing device once the VM is initiated on the workstation, a connection to the VM via dynamic host configuration protocol (DHCP);

receiving, by the processing device, authentication from the VM via the connection;

providing, by the processing device, a private Internet Protocol (IP) address to the VM if the workstation does not have multiple external IP addresses to work with;

receiving, by the processing device, an indication that the VM is logging off from the administrative computing device; and updating, by the processing device, the database of VMs utilized as cloud computing resources with information of the VM related to its non-operational status.

12. The non-transitory machine-readable storage medium of claim 11, wherein the operations further comprise receiving a workstation request for a copy of an image of the VM for download on the workstation in order to adapt the workstation as a cloud computing resource.

13. The non-transitory machine-readable storage medium of claim 11, wherein the information of the VM related to its operational status comprises at least one of information on whether the particular VM is running, a current session rate, current session statistics, bytes in and out, denials, errors, or warnings.

14. The non-transitory machine-readable storage medium of claim 11, wherein an end user of the workstation is not able to access the operational state of the VM.

15. The non-transitory machine-readable storage medium of claim 11, wherein the workstation is an employee workstation of an organization that the organization has purposed as a cloud computing resource during a predetermined time interval.

* * * * *